Aug. 14, 1928.   1,680,293
S. B. HASELTINE
FRICTION SHOCK ABSORBING MECHANISM
Original Filed July 10, 1924   2 Sheets-Sheet 2
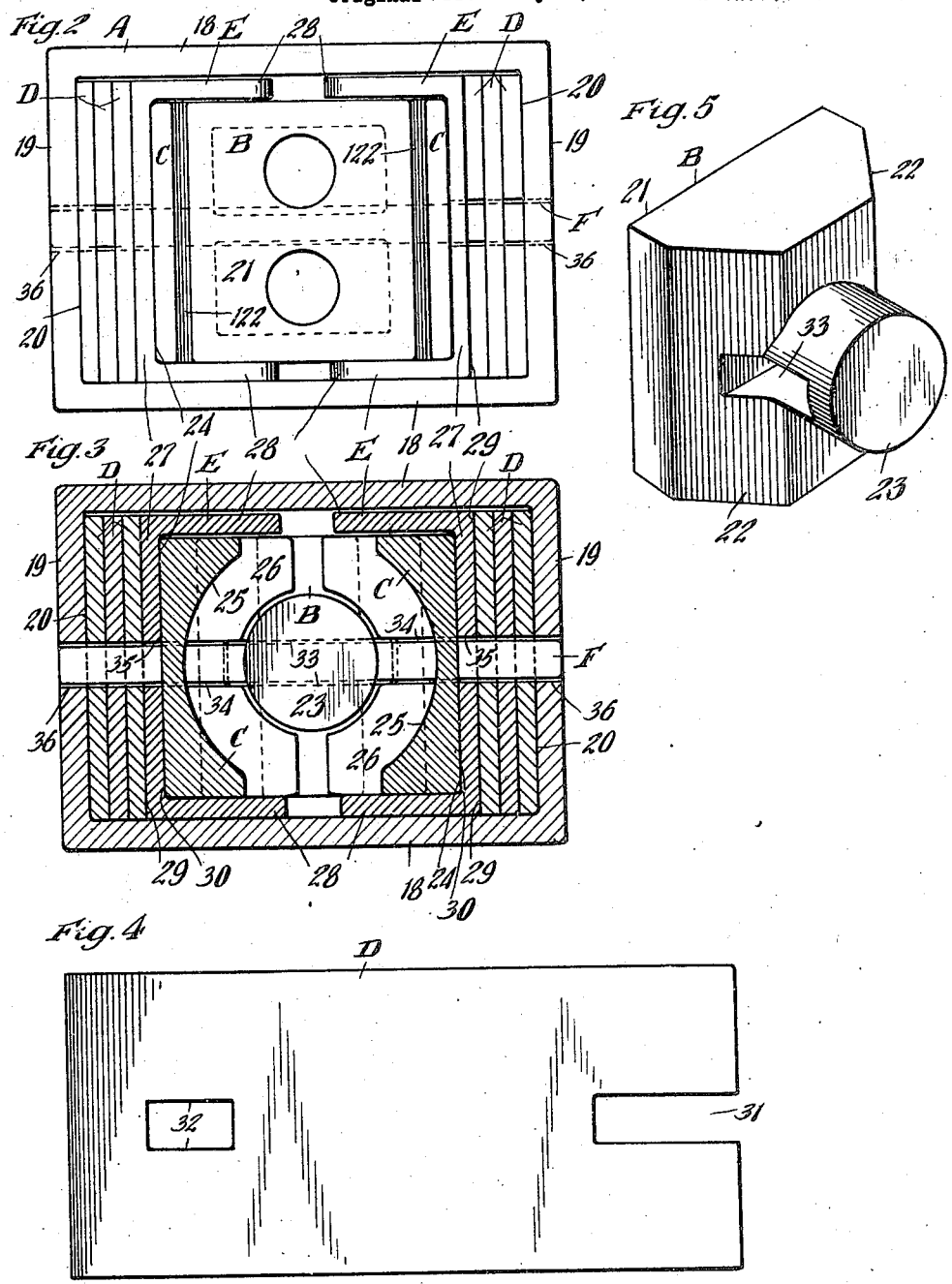

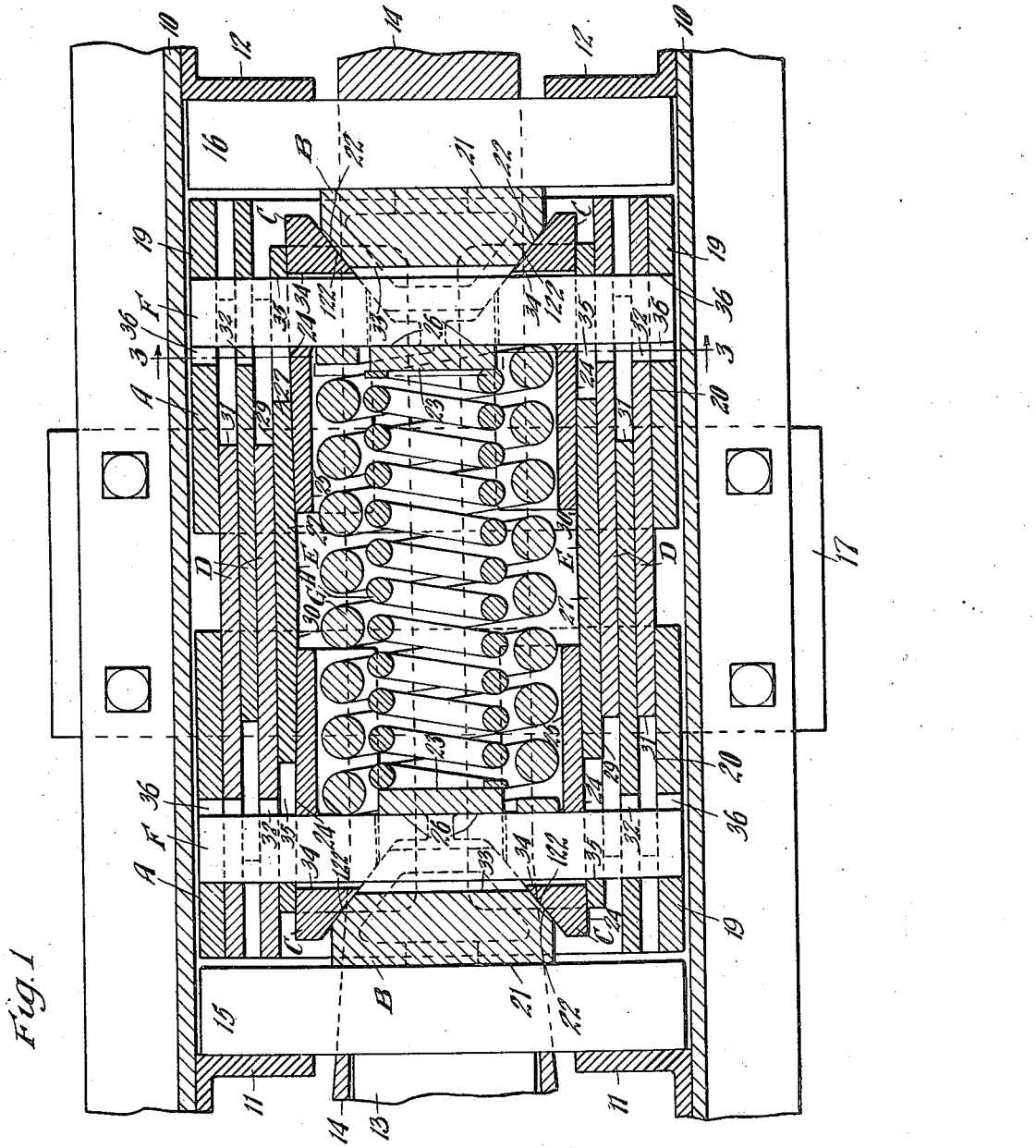

Patented Aug. 14, 1928.

1,680,293

UNITED STATES PATENT OFFICE.

STACY B. HASELTINE, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed July 10, 1924, Serial No. 725,107. Renewed February 6, 1928.

This invention relates to improvements in friction shock absorbing mechanisms.

One object of the invention is to provide a friction shock absorbing mechanism of the intercalated plate type, especially adapted for railway draft riggings, wherein is obtained high capacity due to large frictional areas, together with preliminary action of the followers and wedge devices prior to actual relative movement of the friction plates, to assure easy release of the parts when the actuating force is removed.

Another object of the invention is to provide a shock absorbing mechanism of the character indicated, having a differential action during the compression stroke.

A still further object of the invention is to provide a shock absorbing mechanism including a plurality of relatively movable, follower casings having a plurality of relatively movable friction plates coacting therewith and lateral wedge pressure creating means for placing the plates under pressure, including wedge members and friction shoes wherein all of the parts are interconnected by simple means for restoring the same to normal position after each compression stroke.

In the drawings, forming a part of this specification, Figure 1 is a horizontal, longitudinal, sectional view of a railway draft rigging showing my improvements in connection therewith. Figure 2 is a front end, elevational view of the shock absorbing mechanism proper. Figure 3 is a vertical, transverse, sectional view of the shock absorbing mechanism proper, corresponding substantially to the line 3—3 of Figure 1. Figure 4 is a detail, side elevational view of one of the friction plates used in connection with my improved shock absorbing mechanism. And Figure 5 is a detail perspective view of one of the main wedges.

In said drawings, 10—10 indicate channel-shaped center or draft sills of a railway car underframe, to the inner faces of which are secured front stop lugs 11—11 and rear stop lugs 12—12. The inner portion of the drawbar is shown at 13, to which is attached a hooded yoke 14. The shock absorbing mechanism proper, including front and rear followers 15 and 16, is disposed within the yoke 14 and the movable parts of the draft rigging are supported by a detachable saddle plate 17.

The improved shock absorbing mechanism proper, as shown, comprises broadly, front and rear friction casings of shells A—A; front and rear wedge blocks B—B; front and rear pairs of wedge shoes C—C; two groups of friction plates D—D; a pair of combined wedge and friction elements E—E; front and rear restoring bars F—F; a main spring resistance G; and an auxiliary spring resistance H.

The front and rear friction casings or shells A are of like design, each being of rectangular cross-section and open at its opposite ends. Each casing has longitudinally disposed, spaced top and bottom walls 18—18 and longitudinally disposed, spaced side walls 19—19, the inner sides of the walls 19 presenting longitudinally extending friction surfaces 20, adapted to coact with the outermost plates of the two groups D.

The front and rear wedge blocks B are of like construction, each block having a flat outer face 21 adapted to bear on the inner face of the corresponding main follower; and a pair of wedge faces 22 at the opposite end thereof converging inwardly of the mechanism and adapted to co-operate with the adjacent pairs of friction shoes C. The wedge faces 22 are spaced apart laterally at their inner ends as clearly shown in Figure 5, and between said faces each block is provided with an inwardly projecting, cylindrical extension 23 spaced equally from the top and bottom of the wedge, said extension having a flat end face adapted to form an abutment for the corresponding end of the auxiliary spring resistance H.

The friction wedge shoes C are four in number, arranged in pairs at opposite ends of the mechanism, each shoe C being provided with an outer wedge face 122 on the side nearest the axis of the mechanism, adapted to cooperate with one of the wedge faces 22 of the corresponding wedge block B. On the opposite side, each shoe C has an elongated flat friction surface 24 adapted to cooperate with the combined wedge and friction element E at the corresponding side of the mechanism. At the inner end, rearwardly of the wedge faces 122, each shoe is cut away as shown, thereby providing a concave opening 25 adapted to accommodate one side of the spring resistance G and a transverse abutment face 26 on which the corresponding end of said spring is adapted to bear. As clearly shown in Figure 3, the adjacent sides of each pair of shoes are cut away to provide clearance for the extension 23 of the corresponding wedge block B.

The two wedge friction elements E which are of like construction, are disposed on opposite sides of the mechanism and cooperate respectively with the shoes C and the friction plates D at the corresponding side of the mechanism. As will most clearly appear upon reference to Figures 1, 2 and 3, each of the elements E is of channel-shaped cross-section, each element comprising a vertically disposed wall 27 and spaced, inwardly projecting, horizontally disposed top and bottom flanges 28. The outer side of each wall 27 presents a flat, longitudinally disposed friction surface 29 adapted to cooperate with the innermost plate of the corresponding group D. The opposite side of the wall 27 is provided with a pair of oppositely extending faces 30, each converging slightly with reference to the outer surface 29, from the center to the corresponding end of the element E. The front and rear faces 30 of each element E are adapted to cooperate respectively with the faces 24 of the front and rear shoes on the corresponding side of the gear. As clearly shown in Figures 2 and 3, the top and bottom flanges 28 embrace the shoes C and the wedges B, and function as guides for the same. In addition to forming guide members, the flanges 28 also act to reinforce the elements E, preventing distortion of the same, the elements E in effect forming stiffening members to prevent bending and distortion of the plates D. As will be evident, the elements E also serve to distribute the spreading pressure of the front and rear wedge systems uniformly over the length of the friction plates D.

The friction plates D are disposed within the casings A—A and comprise two oppositely disposed groups. As herein shown each group consists of three plates. The plates D are all of identical design, each plate being provided with an inwardly extending slot 31 at one end and an elongated opening 32 adjacent the opposite end, the slot and opening being disposed in longitudinal alignment and spaced equally from the top and bottom edges of the plate. Adjacent plates of each group are reversely arranged, end for end, the inner and outer plates of each group having their ends provided with the openings 32 disposed at one end of the mechanism, and the intermediate plate of the same group having the end provided with the opening 32 disposed at the opposite end of the mechanism. The two groups of plates are also reversely arranged with reference to each other, the inner and outer plates of each group at one side of the mechanism and the intermediate plate of the group at the opposite side of the mechanism having the ends provided with the recesses 32 disposed at the same end of the mechanism.

The front and rear plate restoring bars F are disposed transversely of the mechanism and each extends through the openings 32 of certain of the plates, and the slots 31 of the oppositely disposed plates, alternate plates of each group being thus anchored to the corresponding bar F for limited relative movement, each of the elongated openings 32 of the plates being of greater dimension in length than the width of the bar and the slots 31 being of sufficient length to permit full compression of the mechanism. Each of the bars is also anchored to the corresponding wedge block B and pair of shoes C, each wedge being provided with a transverse opening 33 and each shoe with a transverse opening 34 through which the corresponding bar extends. The openings 33 and 34 are so proportioned that there is a slight, limited, relative movement between each bar and the cooperating wedge and pair of shoes, the openings 33 being shorter in longitudinal dimension than the openings 32 of the plates, and the openings 34 of the shoes, in turn, being shorter than the opening 33. The bars work in openings 35 provided in the friction elements E, each element having two such openings disposed at opposite ends thereof. Each opening 35 is of such a length as to permit the full, necessary movement of the bar during a compression stroke. Each bar is anchored to the corresponding casing A, the opposite ends of the bar engaging in transversely aligned openings 36 provided in the opposite side walls of the casing, the respective openings 36 being preferably of the same size as the openings 32 of the plates, the casing and corresponding bars being thus arranged for limited relative movement.

In the normal, full released position of the parts, the bars F abut the outer end walls of the corresponding openings 35 of the friction elements E and have their outward movement limited thereby, the bars being held in their outermost position by the shoes C and wedges B, which in turn are forced outwardly by the springs G and H, respectively. The bars F serve to restore the various plates and the shells A to normal position by engagement with the outer end walls of the corresponding openings 32 and 36, and also serve to center the friction element with reference to the other parts. The bars F not only act as restoring bars, but also serve to hold the parts of the mechanism in assembled relation, and in conjunction with the friction elements E serve to maintain the mechanism of proper, uniform overall length and also maintain the same under initial compression. It will be further noted that when the parts are in their normal position, as shown in Figure 1, the outer ends of the front and rear friction shells A are slightly spaced from the corresponding followers, thereby providing for an initial movement of the wedge systems at the front and rear ends of the mechanism, without effecting any relative movement of the plates and front and rear shells. The plates are preferably of a length equal to the combined length of the front and rear casings so that when the mechanism is fully compressed, the front and rear followers will simultaneously abut both the front and rear ends of all of the plates, as well as the outer ends of the front and rear casings, the inner ends of the casings at this time being in abutment also.

The operation of the mechanism is as follows, assuming an inward or buffing movement of the drawbar. The front follower 15 will be moved rearwardly forcing the wedge B rearwardly also, compressing the auxiliary spring H, spreading apart the shoes C at the front end of the mechanism and forcing the same rearwardly, at the same time compressing the spring resistance G between the front and the rear pairs of shoes C. The rear pair of shoes C is thus forced into wedging engagement with the rear wedge B, the latter being held stationary by the follower 16. As will be evident, the wedging action set up between the front and rear wedges and pairs of shoes places the friction plates under lateral pressure. As the rearward movement of the follower 15 continues, the front set of shoes will be moved rearwardly, sliding on the friction surface 30 of the friction elements E and the front follower will gradually approach the front ends of the groups of plates D and the outer end of the front friction casing A. It will be evident that due to the inclination of the surface 30 of the friction elements E, a differential wedge action will be had during the action described, the wedge shoes moving toward each other, slipping on the wedge faces of the main wedges B. Due to the friction between the plates, friction elements E and the front and rear shoes of the mechanism, there will be a balancing action with the result that the rear friction casing will be carried rearwardly and approach the rear follower 16 at substantially the same rate that the front casing is approached by the follower 15. There will also be a corresponding rearward movement of the friction elements E with respect to the rear pair of shoes C effecting a differential action similar to that had at the front end of the mechanism. During this initial action, the front and rear bars F will be picked up and carried idly inwardly of the mechanism by the shoes C through contact with the outer ends of the slots 34 thereof and will be moved away from the end walls of the openings in the plates D, the front and rear casings A and the friction elements E, a clearance also appearing at this time between the innermost edges of the bars and the inner ends of the slots 33 and 34 of the wedges and shoes. This action continues until the front and rear casings and the friction plates are engaged by the front and rear followers, whereupon the front casing will be moved toward the rear casing and the plates moved relatively to each other. The outermost plate at one side of the mechanism will thus be moved relatively to the rear casing and the front casing will be moved relatively to the corresponding plate at the opposite side, while the friction elements E and the innermost plates of the two groups will also be moved relatively to each other. It will be evident that friction will thus be created between the various plates, between the casing and cooperating plates and between the friction elements and cooperating plates and shoes, greatly augmenting the resistance offered.

The described action will continue until the inner ends of the shells A come into abutment and the front and rear ends of all of the friction plates D and the corresponding ends of the shells A abut the front and rear followers respectively, whereupon the force is transmitted directly through the shells A and the friction plates D to the rear stop lugs, the parts being so proportioned as to thereby prevent the springs G and H from being driven solid.

During draft, the action is substantially the reverse of that just described, the front follower 15 remaining stationary and the rear follower being moved toward the same.

Upon reduction of the actuating force, the wedge elements B are instantly freed, independently of the other elements by the expansion of the auxiliary spring H, which acts directly on the wedges B. There will also be an initial release movement of the friction shoes and wedges due to the restoring bars F being spaced from the outer ends of the openings 32 of the plates and the openings 36 of the shells A during the compression of the mechanism, as hereinbefore pointed out. An easy and quick release and certain reduction of lateral pressure on the groups of friction plates is thus assured. As the shoes at the opposite ends of the mechanism are forced outwardly by the spring G, the bars F will be picked up and moved outwardly also, the bars in turn being brought into engagement with the outer ends of the walls of the recesses 32 of the plates D and the recesses 36 of the casings A, restoring the corresponding plates and casing to normal position. The auxiliary spring H, in forcing the wedges outwardly to normal position, also forces the bars F outwardly, thereby assisting in the restoration of the friction plates and casings. Outward movement of the restoring bars is positively limited by engagement with the outer end walls of the openings 35 of the friction elements E, as hereinbefore pointed out, thereby bringing all the parts to normal position and also centering the friction elements E. In this connection, it is pointed out that in the normal position of the parts, a clearance is provided between each restoring bar and the outer end walls of the openings 33 and 34 of the corresponding wedge and pair of shoes, thereby providing sufficient relative movement to assure the inner end walls of the openings 33 and 34 being spaced the proper distance from the inner sides of the restoring bars during compression of the mechanism, to permit necessary movement of the wedge blocks B with reference to the bars F during the initial release of the mechanism while the spring H is acting, and also permit a slight relative movement between the shoes and the bars during the initial release action of the spring G. The initial release of both the wedges and shoes is thus effected independently of any movement of the bars.

It will be evident from the preceding description taken in connection with the drawings, that the restoring bars being anchored to the casings, friction plates, friction elements, shoes and wedges, provide exceedingly simple and efficient means for holding the parts assembled and effecting restoration of the same to normal position. The number of parts of the mechanism are thus accordingly reduced and the usual retainer bolt entirely dispensed with, as the restoring bars in conjunction with the friction elements to which they are anchored serve to maintain the parts assembled and under initial compression. By providing separate spring means for releasing the wedges, the wedges are returned independently of any movement of the outer parts of the mechanism and sticking of the wedges and shoes is prevented.

I have herein shown and described what I now consider the preferred manner of carrying out the invention, but the same is merely illustrative, and I contemplate all changes and modifications that come within the scope of the claims appended hereto.

I claim:

1. In a friction shock absorbing mechanism, the combination with front and rear followers, relatively movable toward and away from each other; front and rear friction casings, said casings being relatively movable toward and away from each other, said casings and followers having limited relative movement; a plurality of longitudinally disposed, relatively movable friction plates within said casings engageable with said followers and adapted to be moved by the latter, said plates being divided into two groups at opposite sides of the mechanism the plates of said groups being intercalated; a lateral wedge pressure creating means at each end of the mechanism; tapered friction elements interposed between each group of plates and the lateral wedge pressure creating means; and a main spring resistance.

2. In a friction shock absorbing mechanism, the combination with front and rear followers, relatively movable toward each other; of front and rear casings, also relatively movable toward each other; longitudinally disposed, relatively movable, intercalated friction plates within said casings, said plates being divided into two groups disposed at opposite sides of the mechanism; lateral pressure creating means disposed at opposite ends of the mechanism, each of said means including a main wedge and a pair of friction wedge shoes; a spring resistance coacting with said shoes; a second spring resistance directly coacting with said wedge members; and a restoring bar anchored to each of said wedge members, pair of friction shoes, casing and certain plates of each group, for restoring the plates and casings to normal position.

3. In a friction shock absorbing mechanism, the combination with front and rear followers relatively movable toward each other; of front and rear casings also movable relatively toward each other, each of said casings being provided with longitudinally disposed interior friction surfaces; longitudinally disposed, intercalated friction plates within said casings, said plates being divided into two groups disposed at opposite sides of the mechanism and coacting with the respective friction surfaces of the casings; lateral pressure creating means disposed at the opposite ends of the mechanism, each of said means including a wedge and a pair of friction wedge shoes; tapered friction elements interposed between the groups of plates and lateral pressure creating means; a spring resistance coacting with said shoes; a second spring resistance directly coacting with said wedge blocks only; and a restoring bar anchored to each of said wedge members, each pair of friction shoes, each casing and certain plates of each group for restoring the plates and casings to normal position.

4. In a friction shock absorbing mechanism, the combination with front and rear followers relatively movable toward and away from each other; of front and rear casings also relatively movable toward and away from each other, said casings having longitudinally disposed, interior friction surfaces; friction plates within said casings, said plates being divided into two groups disposed at opposite sides of the mechanism and coacting with the respective friction surfaces of the casings; lateral pressure creating means disposed at opposite ends of the mechanism, each of said means including a main wedge and a cooperating pair of friction shoes; friction elements interposed between the groups of plates and said lateral pressure creating means, said elements having longitudinally extending reinforcing means thereon; spring resistance elements coacting respectivly with the friction shoes and the wedge blocks at the opposite ends of the mechanism, and restoring bars anchored to the friction elements to limit the outward separation of said bars, said bars being also anchored to said shoes and wedges to limit the outward movement thereof, and further anchored to certain of said plates and said casings to restore the same to normal position.

5. In a friction shock absorbing mechanism, the combination with front and rear followers relatively movable toward and away from each other; of front and rear casings also relatively movable toward each other, said casings having interior, longitudinally disposed friction surfaces; relatively movable friction plates within said casings, said plates being divided into two groups disposed at opposite sides of the mechanism; lateral pressure creating means disposed between said groups of plates at opposite ends of the mechanism, each of said means including a main wedge and a pair of wedge friction shoes; a main spring resistance coacting with said shoes at the opposite ends of the mechanism; a second spring resistance directly coacting with said wedge blocks only; bars for restoring said plates and casings to normal position; and means directly engaging said bars for limiting their relative separation.

6. In a friction shock absorbing mechanism, the combination with front and rear follower acting means, said means being movable toward and away from each other; of front and rear relatively movable friction shells having interior, longitudinally disposed friction surfaces; of a plurality of relatively movable intercalated friction plates within said shell, said plates being divided into two groups at opposite sides of the mechanism and cooperating respectively with the friction surfaces of the shell; wedge spreading means at opposite ends of the mechanism disposed between said groups of plates for placing the same under lateral pressure; a spring resistance; unitary means at opposite ends of the mechanism anchored to said shell and plates for restoring the same to normal position; and floating means directly engaging said unitary means at opposite ends of the mechanism for limiting the outward movement of said unitary means.

7. In a friction shock absorbing mechanism, the combination with follower acting means; of a longitudinally movable, lateral pressure resisting member, said member and means being relatively movable, said member having longitudinally disposed friction surfaces; of a plurality of intercalated, relatively movable friction plates cooperating with the friction surfaces of said member; lateral pressure creating means for placing said plates under pressure and forcing the same against the friction surfaces of said member; a main spring resistance having one end thereof co-operating with said lateral pressure-creating means; a restoring bar anchored to said member, and certain of said plates for restoring said last-named plates and said member to normal position; means yieldingly held against movement in one direction by said spring resistance directly engaging said bar for limiting its outward movement.

8. In a friction shock absorbing mechanism, the combination with front and rear followers relatively movable toward and from each other; of front and rear friction casings, said casings being also relatively movable toward and away from each other; a plurality of longitudinally disposed relatively movable intercalated friction plates within said casings, said plates being divided into two groups at opposite sides of the mechanism; a lateral wedge pressure creating means at each end of the mechanism; a tapered friction element interposed between each group of plates and the lateral pressure creating means; a main spring resistance; restoring bars for returning said casings and friction plates to normal position; and abutment means on said friction elements for limiting the relative separation of said bars.

9. In a friction shock absorbing mechanism, the combination with front and rear follower acting means; of a friction system including friction elements, a plurality of longitudinally disposed, relatively movable, intercalated friction plates cooperating with said follower acting means and friction elements; and means for placing said plates under lateral pressure; a main spring resistance; a restoring bar anchored to certain of said plates; a second restoring bar anchored to the remaining plates; and floating tie members connecting said first and second named bars for limiting their relative separation.

10. In combination, a pair of sills having draft and buffer lugs thereon, a draft gear between said lugs, said gear comprising a pair of follower plates, a pair of sleeves between said plates, a group of intercalated friction plates within said sleeves, wedging means for forcing said plates into frictional engagement during the compression of said gear; retracting bars interlocked with said plates, resilient means for moving said wedging means outwardly upon release thereof, interlocking connections between said wedge means and bars and between said bars and sleeves, whereby said sleeves and plates are moved to normal position by said resilient means after compression.

In witness that I claim the foregoing I have hereunto subscribed my name this 1st day of July, 1924.

STACY B. HASELTINE.